March 2, 1943.  C. W. SOULE  2,312,370
ELEMENTARY FLIGHT TRAINING DEVICE
Filed Jan. 23, 1942 2 Sheets-Sheet 1
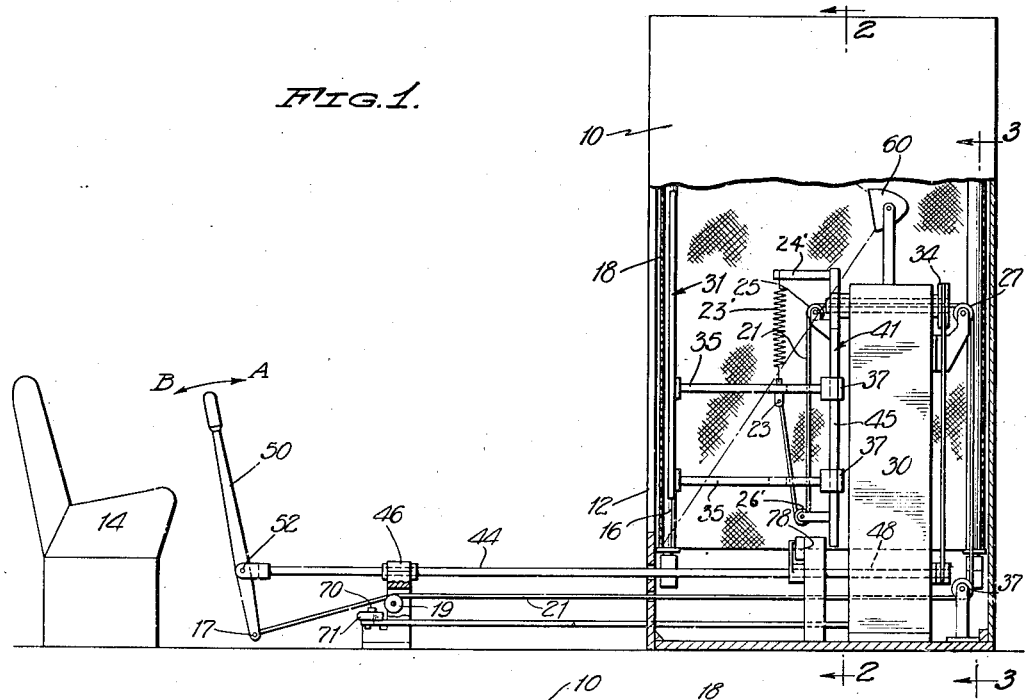
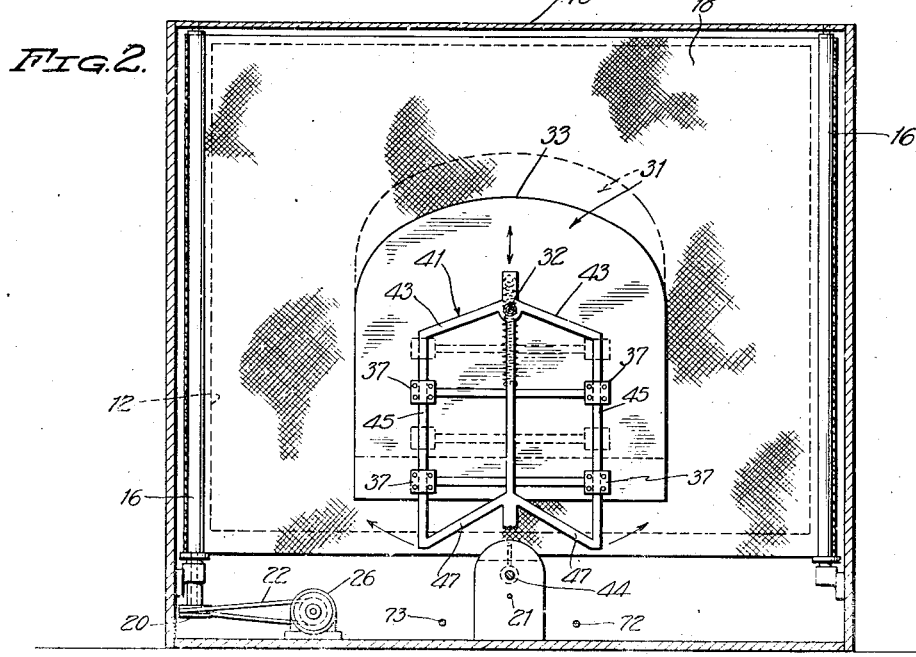
CHARLES W. SOULE.
INVENTOR.
BY Ely & Pattison
ATTORNEYS.

March 2, 1943.  C. W. SOULE  2,312,370
ELEMENTARY FLIGHT TRAINING DEVICE
Filed Jan. 23, 1942  2 Sheets-Sheet 2
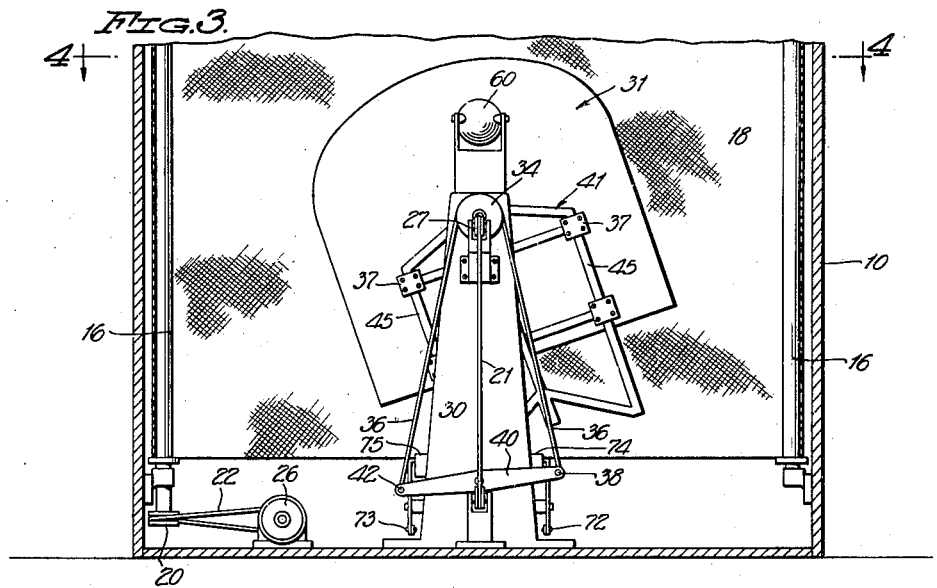
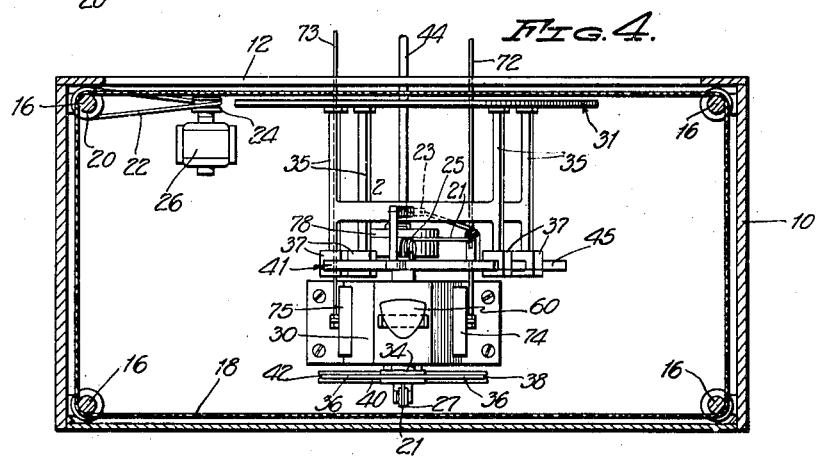
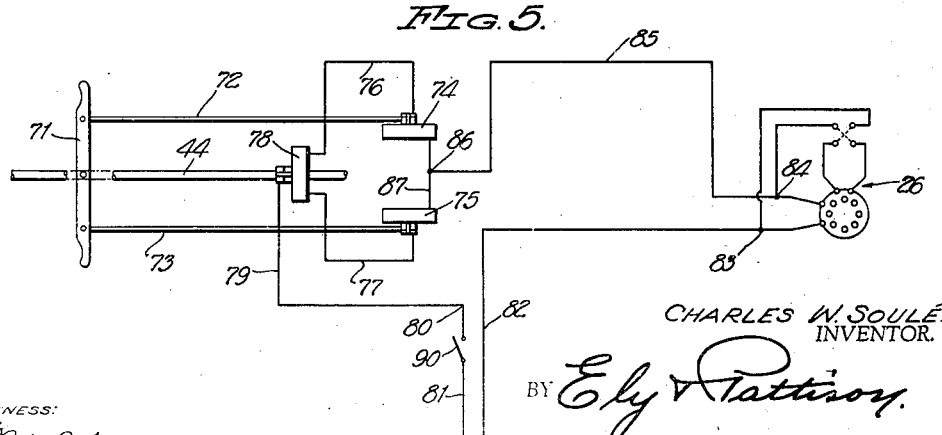
CHARLES W. SOULE.
INVENTOR.
BY Ely & Pattison.
ATTORNEYS.
WITNESS:

Patented Mar. 2, 1943

2,312,370

UNITED STATES PATENT OFFICE 2,312,370

ELEMENTARY FLIGHT TRAINING DEVICE

Charles W. Soule, Winnemucca, Nev., assignor of one-third to Oliver Ramsdell, Winnemucca, Nev.

Application January 23, 1942, Serial No. 427,869

6 Claims. (Cl. 35—12)

The present invention relates to new and useful improvements in devices for training persons in the art of flying aircraft.

It is one of the objects of the invention to provide a device by which student flyers may acquire the art of manipulation of controls of airplanes in order to properly fly the same.

It is a further object of the invention to provide a device of the aforementioned character in which some of the conditions of actual flying may be presented to a student by means of stationary mechanisms.

It is a further object of the invention to provide novel means for indicating to the student whether he has performed the proper manipulations or operations of the airplane controls under certain conditions of flight indicated by the apparatus.

Other objects of the invention will appear as the nature of the invention is better understood, and for this purpose, reference will now be had to the accompanying drawings in which:

Figure 1 is a view in side elevation partly in section illustrating a device constructed in accordance with the present invention, Figure 2 is a vertical sectional view taken substantially on the line 2—2 of Figure 1, Figure 3 is a vertical sectional view taken substantially on the line 3—3 of Figure 1, Figure 4 is a horizontal sectional view taken substantially on the line 4—4 of Figure 3, and;

Figure 5 is a diagrammatic view illustrating the electrical apparatus and the wiring thereof.

Referring to the drawings, the device comprises a housing 10, which is preferably of rectangular form and which has a viewing opening 12 in one wall thereof.

Mounted in spaced relation to the viewing opening 12 of the housing, there is a student's seat 14 which is so disposed as to face said viewing opening.

As illustrated in Figure 4, the housing 10 is preferably of rectangular form and mounted in each corner thereof, there is a vertically disposed roller 16. Passing around these rollers 16, there is an endless web 18. This endless web member 18 is preferably of a translucent nature, and in its movement, it is adapted to pass the viewing opening 12 of the housing in either a right or left hand direction.

One of the rollers 16 is provided with a pulley 20, and passing around said pulley, there is a belt 22 which passes around a pulley 24 mounted upon the armature shaft of a reversible electric motor 26.

Mounted in the housing 10, there is a pedestal 30, and mounted for oscillation in said pedestal 30, there is a shaft 32. The shaft 32 carries a pulley 34 at its rear end, see Figures 1 and 3, and passing around said pulley, there is a driving belt 36. One end of the driving belt 36 is connected as at 38 to a rocking arm 40, the other end of said driving belt being connected to the opposite end of the rocking arm 40, as at 42.

The rocking arm 42 is carried by means of a rotating shaft 44 mounted in a bearing 46 and in the pedestal 30 heretofore mentioned, as at 48.

The shaft 44 may be rocked in either direction by means of a lever 50 which is pivotally connected as at 52 in the end of the shaft 44 and which corresponds to the so called "stick" of a conventional airplane control mechanism.

From the foregoing, it will be apparent that if a student occupying the student's seat 14 rocks the lever 50 to the right or to the left, the shaft 44 will be correspondingly rotated, and through the medium of the belt 36 will rotate the shaft 32 in a direction corresponding to that of the movement of the lever 50.

Mounted upon the shaft 32 and rigidly secured in such a manner that it will rock with said shaft, there is a frame 41. This frame comprises upper members 43, side member 45, and lower end members 47.

Slidably mounted for reciprocating movement relative to the frame 41, there is a member 31 which simulates or corresponds to the nose of an airplane body, and this member will be hereinafter referred to as the nose element.

The nose element 31 preferably has a rounded edge 33 and is provided on its rear face with rearwardly projecting arms 35, the rear ends of which are provided with bearings 37, which embrace the side members 45 of the frame 41, as best illustrated in Figure 1. As also seen from Figure 1, a pull cable 21 is connected as at 23 to one of the arms 35 and interposed between one of these arms 35 and an arm 24' projecting from the frame 41, there is a spring 23'. This pull cable passes downwardly around a pulley 26' and upwardly over the pulleys 25 and 27 carried by the pedestal 30, and downwardly beneath a pulley 37' mounted in the lower portion of the housing from which pulley it passes over a pulley 19, preferably mounted on the bearing 46 heretofore mentioned, and is connected as at 17 to the lower end of the lever 50.

With the stick 50 in its neutral position with respect to fore and aft movement, the spring 23' is under sufficient tension to lift the nose element 31 should the stick 50 be moved in a rearward direction to produce slack in the pull cable 21.

However, with a plane at rest, the nose is slightly elevated, in which position of the nose, the stick is in its neutral position.

By this construction, it will be apparent that upon operation of the lever 50 about its pivotal point 52 as indicated by the arrow A in Figure 1, a pull will be exerted upon the pull cable 21 thus moving the frame 41 downwardly and moving the nose element 31 downwardly. If, however, the lever 50 be rocked in the direction of the arrow B, a slack will be provided in the cable 21, and under the influence of the spring 23, the nose element 31 will move upwardly upon the frame 41, the extent of movement of the nose element in either direction being determined by the extent of movement imparted to the lever 50.

It will be noted that the nose element 31 is mounted directly behind the translucent endless web 18, and by reference to Figure 1, it will be seen that illuminating means in the form of a lamp 60 is employed to cast a shadow of the nose element 31 upon the rear face of the endless web 18. By this construction and arrangement, it will be obvious that the shadow of the nose element 31 cast upon the endless web 18 will be clearly visible from the student's seat 14, since, as heretofore stated, the endless web 18 is of a translucent character.

The endless web 18 is painted or otherwise provided with a landscape scene in simulation of the earth's surface, and this member will be hereinafter referred to as the scenic element.

As thus far described, the operation of the device will now be set forth for the purposes of training a student in the art of flying. The rocking of the frame 41 from left to right as viewed from the student's seat would move the nose element correspondingly to the left as illustrated in Figure 3 indicating to the student that he is steering the airplane to the left. Correspondingly a movement from right to left would move the nose element towards the right indicating that he was steering the airplane towards the right.

Rocking of the lever 50 rearwardly or in the direction of the arrow B by the student, would effect an elevation of the nose element 31 under the influence of the spring 23' and give the indication of an ascent of an airplane, while rocking said lever in the direction of the arrow A would produce just the opposite effect.

It will be understood, of course, that in the above described operations, the several impressions are transmitted to the student by movements of the shadow of the nose element 31 upon the scenic element 18. As thus far described, it will be obvious that the teaching of such fundamentals of operation as ascent and descent of an airplane and steering thereof from right to left may be accomplished.

In order to give a more realistic effect and also to indicate whether the student performs the proper operations under certain flying conditions, the scenic element 18 is movable in opposite directions relative to the viewing opening 12 of the housing. For example, should the student properly operate the controls to move the nose element to the position indicating a left turn, the scenic element 18 would be moved from left to right producing the effect of the plane moving from right to left relatively to the earth's surface. On the other hand, however, should the controls be properly operated by the student to move the nose element to the position indicating a right turn, the scenic element would be moved in a direction from right to left producing the effect of the nose element moving with relation to the earth's surface in a direction from left to right.

If, however, the student does not effect a proper operation of the controls under the aforementioned flying conditions, the scenic element would remain immovable relative to the viewing opening as an indication that the proper operation had not been performed. The manner in which this result is obtained will now be described.

Pivotally mounted as at 70, preferably upon the base of the bearing 46, there is a foot operated lever 71 which corresponds to the foot or rudder bar of an airplane control mechanism. This bearing as illustrated in Figure 5, is connected by means of a rod 72 to an electric switch 74, and by means of a rod 73 to an electric switch 75. These electric switches 74 and 75 are connected respectively by conductors 76 and 77 with a two-point switch 78 operated by the rocking shaft 44.

Leading from the switch 78, there is a conductor 79 which is connected as at 80 to one leg 81 of a suitable power supply line. The other leg 82 of the power supply line is connected direct to the terminal 83 of the reversible motor 26. Leading from the other terminal 84 of the reversible motor 26, there is a conductor 85, which in turn is connected as at 86 to a conductor 87 which electrically connects the switches 74 and 75, heretofore mentioned.

The wiring diagram is such that the switches 74, 75, and 78 must be properly operated in order to effect a movement of the scenic element in the proper direction, and if the proper operations are not performed, the reversible motor 26 will not be operated, with the result that the scenic element remains at rest relatively to the viewing opening 12 of the housing.

For example, assuming that the student seated in the seat 14 operated the lever 50 moving it towards the right, rotating the shaft 44 in a clockwise direction, thus moving the frame 41 to the left and the nose element 31 to the right. In order to complete the proper execution of such a maneuver, it would be necessary to operate the rudder of an airplane. The equivalent of this operation is provided for by the proper rocking of the foot operated lever 71, and this operation will now be described. If the lever 71 is moved in a clockwise direction in Figure 5, the circuit will be completed at the switch 75, through conductors 87 and 85, reversible motor 26, conductor 82 to the source of power, through the conductor 81, it being understood that the switch 90 is closed, conductor 79, switch 78 and conductor 77, to operate the motor in the proper direction to move the scenic element 18 from right to left.

The above described operation is an example of the proper operations of the controls, and the result of an improper operation will now be described.

Assuming that the lever 50 has been operated from left to right as indicated and instead of rocking the foot operated lever 71 in the clockwise direction, it had been operated in the counter clockwise direction, the circuit would not be closed by the switch 75, but instead would be closed by the switch 74. However, by rocking of the shaft 44 in a clockwise direction, the switch 78 would not complete the circuit between the conductors 79 and 76, and the entire circuit would remain open at the switch 75, and no operation of the reversible motor 26 would be had with the consequence that the scenic element remains at rest relatively to the viewing opening 12 of the housing; thus indicating that an improper operation of the controls was effected by the student.

Thus it will be apparent that when the lever 50 and foot lever 71 are properly operated in unison to produce any desired maneuver, the scenic element will be operated to product a realistic effect, and on the other hand, improper operation of either of these elements results in no movement of the scenic element to indicate that an improper operation has been performed.

From the foregoing it will be apparent that the present invention provides a novel training device for student pilots by means of which a student may be taught the fundamental operations of the airplane control, and further, the invention provides means for indicating to the student or instructor, or both, when an improper operation of the controls has been effected by the student.

While the invention has been herein illustrated in its preferred form, it is not to be limited to the specific construction herein described, and it may be practiced in other forms without departing from the spirit thereof.

Having thus described the invention, what I claim to be new is:

1. An apparatus of the character described comprising in combination, a housing having a viewing opening in one of its side walls, a student's seat spaced with respect to said housing and facing the viewing opening thereof, a translucent scenic element movable in opposite directions past the viewing opening of the housing, an airplane nose element, means for mounting the said nose element to the rear of the scenic element for oscillatory and reciprocating movement in a plane parallel to the plane of the scenic element, means for casting a shadow of the nose element upon the scenic element, manually operated means operable from the student's seat for imparting both oscillatory and reciprocating movement to the nose element, a reversible motor for operating said scenic element, and means operable from the student's seat for controlling the operation of the reversible motor to move the scenic element in opposite directions relative to the oscillating movement imparted to the nose element.

2. An apparatus of the character described comprising in combination, a housing having a viewing opening in one of its side walls, a student's seat spaced from the housing and facing the viewing opening thereof, a translucent scenic element movable in opposite directions past the viewing opening of the housing, a reversible motor for operating said scenic element, an airplane nose element, means for mounting said nose element at the rear of the scenic element for oscillatory and reciprocating movement in a plane substantially parallel to the plane of the scenic element, illuminating means for casting a shadow of the nose element upon the scenic element at the viewing opening of the housing, means for imparting oscillatory movement to said nose element, means for imparting reciprocating movement to the nose element, a single means operative from the student's seat for selectively operating the nose element oscillating means, and the nose element reciprocating means either singly or in unison, and a second manually operated means operable from the student's seat for controlling the operation of the reversible motor.

3. An apparatus of the character described comprising in combination, a housing having a viewing opening in one of its side walls, a student's seat spaced from the housing and facing the viewing opening thereof, a translucent scenic element movable in opposite directions past the viewing opening of the housing, a reversible motor for operating said scenic element, an airplane nose element, means for mounting said nose element at the rear of the scenic element for oscillatory and reciprocating movement in a plane substantially parallel to the plane of the scenic element, illuminating means for casting a shadow of the nose element upon the scenic element at the viewing opening of the housing, means for imparting the oscillatory movement to said nose element, means for imparting reciprocating movement to the nose element, a single means operable from the student's seat for singly or simultaneously operating the nose element oscillating means and the nose element reciprocating means, and a second manually operated means operable from the student's seat for controlling the operation of the reversible motor.

4. An apparatus of the character described comprising in combination, a housing having a viewing opening in one of its side walls, a student's seat spaced from the housing and facing the viewing opening thereof, a normally stationary translucent scenic element mounted for movement in opposite directions by the viewing opening of the housing, a reversible motor for operating said translucent scenic element relatively to the viewing opening of the housing, an airplane nose element, means for mounting the nose element at the rear of the scenic element for oscillatory and reciprocating movement in a plane substantially parallel to the plane of the scenic element, illuminating means for casting a shadow of the nose element upon the scenic element at the viewing opening of the housing, means for imparting oscillatory motion to the nose element, means for imparting reciprocating movement to the nose element, a single means for selectively operating the nose element operating means and the nose element reciprocating means either singly or in unison, a circuit for said reversible motor, a pair of switches in said circuit to control the direction of operation of the reversible motor, means operable from the student's seat for alternately operating said switches, and a pair of switches operated by the nose element oscillating means for controlling the circuit of the reversible motor in unison with said first mentioned switches in the reversible motor circuit whereby the reversible motor is rendered inoperative upon improper operation of the first mentioned switches.

5. An apparatus of the character described comprising in combination, a housing having a viewing opening in one of its side walls, a student's seat spaced with respect to said housing and facing the viewing opening thereof, a translucent scenic element movable in opposite directions past the viewing opening of the housing, a reversible motor for operating said scenic element, a circuit for said motor, a pair of switches in said circuit for controlling the operation of said motor, a pedestal mounted in the housing, a frame mounted for oscillatory movement in said pedestal, means for oscillating said frame in its mounting, an airplane nose element slidably mounted in said oscillatory frame, means for reciprocating the nose element upon said frame, means operable from the student's seat for oscillating the frame and for reciprocating the nose element relatively thereto, separate means operable from the student's seat for operating said switches to close the circuit of the reversible motor for selective operation, and a pair of switches in the motor circuit adapted for manual operation in unison with said aforementioned switches by the nose element oscillating means for rendering the reversible motor inoperative upon improper operation of the first mentioned switches.

6. An apparatus of the character described comprising in combination, a stationary student's seat, a translucent scenic element mounted in spaced relation to the student's seat in viewing relation thereto, means for mounting said scenic element for movement in opposite directions relative to the student's seat, means for moving said scenic element selectively in opposite directions relative to the student's seat, an airplane nose element, means for mounting the airplane nose element to the rear of the scenic element for oscillatory and reciprocating movement relatively thereto, means for casting a shadow of the nose element upon the scenic element, means operable from the student's seat for imparting oscillating and reciprocating movement to the nose element and separate means operable from the student's seat for controlling the operation of the scenic element operating means.

CHARLES W. SOULE.